US010329951B2

(12) United States Patent
Walker

(10) Patent No.: US 10,329,951 B2
(45) Date of Patent: Jun. 25, 2019

(54) SEALING CONFIGURATIONS WITH ACTIVE COOLING FEATURES

(71) Applicant: UNITED TECHNOLOGIES CORPORATION, Farmington, CT (US)

(72) Inventor: Brady Walker, Glastonbury, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 15/617,598

(22) Filed: Jun. 8, 2017

(65) Prior Publication Data
US 2018/0355757 A1 Dec. 13, 2018

(51) Int. Cl.
F16J 15/34 (2006.01)
F01D 25/12 (2006.01)
F01D 25/16 (2006.01)
F01D 11/00 (2006.01)
F01D 25/18 (2006.01)
F16J 15/16 (2006.01)

(52) U.S. Cl.
CPC ............ *F01D 25/125* (2013.01); *F01D 11/00* (2013.01); *F01D 11/003* (2013.01); *F01D 25/162* (2013.01); *F01D 25/18* (2013.01); *F01D 25/183* (2013.01); *F16J 15/162* (2013.01); *F16J 15/3404* (2013.01); *F05D 2220/32* (2013.01); *F05D 2240/60* (2013.01); *F05D 2260/38* (2013.01); *F05D 2260/52* (2013.01)

(58) Field of Classification Search
CPC ...... F01D 25/125; F01D 25/162; F01D 25/18; F01D 11/003; F05D 2220/32; F05D 2240/60; F05D 2260/52; F16J 15/162; F16J 15/441; F16J 15/34; F16J 15/3404; F16J 15/3436
See application file for complete search history.

(56) References Cited

U.S. PATENT DOCUMENTS

| 4,406,460 | A | 9/1983 | Slayton |
| 5,558,341 | A | 9/1996 | McNickle et al. |
| 5,622,438 | A | 4/1997 | Walsh et al. |
| 6,145,843 | A | 11/2000 | Hwang |
| 9,695,941 | B2* | 7/2017 | Fichtner ............... F16J 15/3404 |

(Continued)

FOREIGN PATENT DOCUMENTS

| GB | 2216964 | 10/1989 |
| WO | 2014133952 | 9/2014 |

OTHER PUBLICATIONS

European Patent Office, European Search Report dated Jan. 30, 2019 in Application No. 18175510.9.

*Primary Examiner* — Gilbert Y Lee
(74) *Attorney, Agent, or Firm* — Snell & Wilmer, L.L.P.

(57) ABSTRACT

Sealing configurations with active cooling features are provided. A forward sealing configuration may comprise a forward bellows spring configured to interface with a forward seal plate. An aft sealing configuration may comprise an aft bellows configured to interface with an aft seal plate. The forward bellows spring and the aft bellows spring may be configured to provide an axial force against each respective seal plate. The forward seal plate and the aft seal plate may include cooling holes configured to deliver a lubricating fluid to each respective seal interface to provide active cooling to each respective sealing configuration.

19 Claims, 5 Drawing Sheets

(56) References Cited

U.S. PATENT DOCUMENTS

| | | | |
|---|---|---|---|
| 2009/0230628 A1* | 9/2009 | Dobek | F16J 15/3404 277/379 |
| 2014/0217676 A1* | 8/2014 | Hosoe | F16J 15/3412 277/350 |
| 2016/0356383 A1* | 12/2016 | Fichtner | F16J 15/3404 |

* cited by examiner

SEALING CONFIGURATIONS WITH ACTIVE COOLING FEATURES

FIELD

The present disclosure relates generally to gas turbine engines, and more specifically, to sealing configurations with active cooling features for gas turbine engines.

BACKGROUND

Gas turbine engines typically include a fan section, a compressor section, a combustor section and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

SUMMARY

In various embodiments, a sealing configuration for an axially forward section of a bearing compartment of a gas turbine engine is disclosed. The sealing configuration may comprise a seal plate. The seal plate may comprise: a first seal plate surface axially opposite a second seal plate surface; a fluid cavity defining a void on the second seal plate surface; and a plurality of cooling holes in fluid communication with the fluid cavity, each cooling hole defining a channel through the first seal plate surface into the fluid cavity. The sealing configuration may also comprise a bellows spring configured to interface with the first seal plate surface of the seal plate. The bellows spring may be configured to provide an axial force against the first seal plate surface of the seal plate.

In various embodiments, the sealing configuration may further comprise: a seal housing coupled to a first axial end of the bellows spring; a carbon carrier coupled to a second axial end of the bellows spring; and a carbon coupled to the carbon carrier, wherein the carbon is configured to provide a sealing interface against the first seal plate surface of the seal plate. The first seal plate surface may comprise a first seal plate contact surface configured to interface with the bellows spring. The first seal plate contact surface may define a hydrodynamic groove configured to provide a hydrodynamic lift force to the interface of the first seal plate contact surface and the bellows spring. The first seal plate surface may comprise a chrome carbide coating.

In various embodiments, a sealing configuration for an axially aft section of a bearing compartment of a gas turbine engine is disclosed. The sealing configuration may comprise a seal plate. The seal plate may comprise: a first seal plate surface axially opposite a second seal plate surface; a fluid dam defining a void on a radially inner surface of the seal plate; and a plurality of cooling holes in fluid communication with the fluid dam, each cooling hole defining a channel through the second seal plate surface into the fluid dam. The sealing configuration may also comprise a bellows spring configured to interface with the second seal plate surface of the seal plate. The bellows spring may be configured to provide an axial force against the second seal plate surface of the seal plate.

In various embodiments, the sealing configuration may further comprise: a seal housing coupled to a first axial end of the bellows spring; a carbon carrier coupled to a second axial end of the bellows spring; and a carbon coupled to the carbon carrier, wherein the carbon is configured to provide a sealing interface against the second seal plate surface of the seal plate. The second seal plate surface may comprise a second seal plate contact surface configured to interface with the bellows spring. The second seal plate contact surface may define a hydrodynamic groove configured to provide a hydrodynamic lift force to the interface of the second seal plate contact surface and the bellows spring. The second seal plate surface may comprise a chrome carbide coating.

In various embodiments, a gas turbine engine is disclosed. The gas turbine engine may comprise: a bull gear coupled to a rotating shaft; a forward sealing configuration coupled to the rotating shaft forward the bull gear; and an aft sealing configuration coupled to the bull gear aft the forward sealing configuration. The forward sealing configuration may comprise: a forward seal plate, comprising: a first forward seal plate surface axially opposite a second forward seal plate surface; a fluid cavity defining a void on the second forward seal plate surface; and a plurality of forward cooling holes in fluid communication with the fluid cavity, each forward cooling hole defining a channel through the first forward seal plate surface into the fluid cavity; and a forward bellows spring configured to interface with the first forward seal plate surface, wherein the forward bellows spring is configured to provide a first axial force against the first forward seal plate surface. The aft sealing configuration may comprise: an aft seal plate, comprising: a first aft seal plate surface axially opposite a second aft seal plate surface; a fluid dam defining a void on a radially inner surface of the aft seal plate; and a plurality of aft cooling holes in fluid communication with the fluid dam, each aft cooling hole defining a channel through the second aft seal plate surface into the fluid dam; and an aft bellows spring configured to interface with the second aft seal plate surface, wherein the aft bellows spring is configured to provide a second axial force against the second aft seal plate surface.

In various embodiments, the gas turbine engine may also comprise a lubricating spray nozzle located forward of the bull gear, the lubricating spray nozzle comprising a first fluid outlet and a second fluid outlet. A radially inner surface of the bull gear and a radially outer surface of the rotating shaft may define a fluid passage configured to receive a lubricating fluid from the first fluid outlet of the lubricating spray nozzle, and wherein the fluid passage is in fluid communication with the fluid dam of the aft seal plate. The aft cooling holes may be configured to receive the lubricating fluid from the fluid dam and deliver the lubricating fluid to a location adjacent to the interface of the second aft seal plate surface and the aft bellows spring. The fluid cavity of the forward seal plate may be configured to receive a lubricating fluid from the second fluid outlet of the lubricating spray nozzle. The forward cooling holes may be configured to receive the lubricating fluid from the fluid cavity and deliver the lubricating fluid to a location adjacent to the interface of the first forward seal plate surface and the forward bellows spring. The forward sealing configuration may further comprise: a forward seal housing coupled to a first axial end of the forward bellows spring; a forward carbon carrier coupled to a second axial end of the forward bellows spring; and a forward carbon coupled to the forward carbon carrier, wherein the forward carbon is configured to provide a forward sealing interface against the first forward seal plate surface of the forward seal plate. The aft sealing configuration may further comprise: an aft seal housing coupled to a first axial end of the aft bellows spring; an aft carbon carrier coupled to a second axial end of the aft bellows spring; and an aft carbon coupled to the aft carbon carrier, wherein the aft carbon is configured to provide an aft sealing interface against the second aft seal plate surface of the aft seal plate. The first forward seal plate surface of the forward seal plate may define a forward hydrodynamic groove configured to provide a hydrodynamic lift force to the interface of the first forward seal plate surface and the forward bellows spring. The second aft seal plate surface of the aft seal plate may define an aft hydrodynamic groove configured to provide a hydrodynamic lift force to the interface of the second aft seal plate surface and the aft bellows spring.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
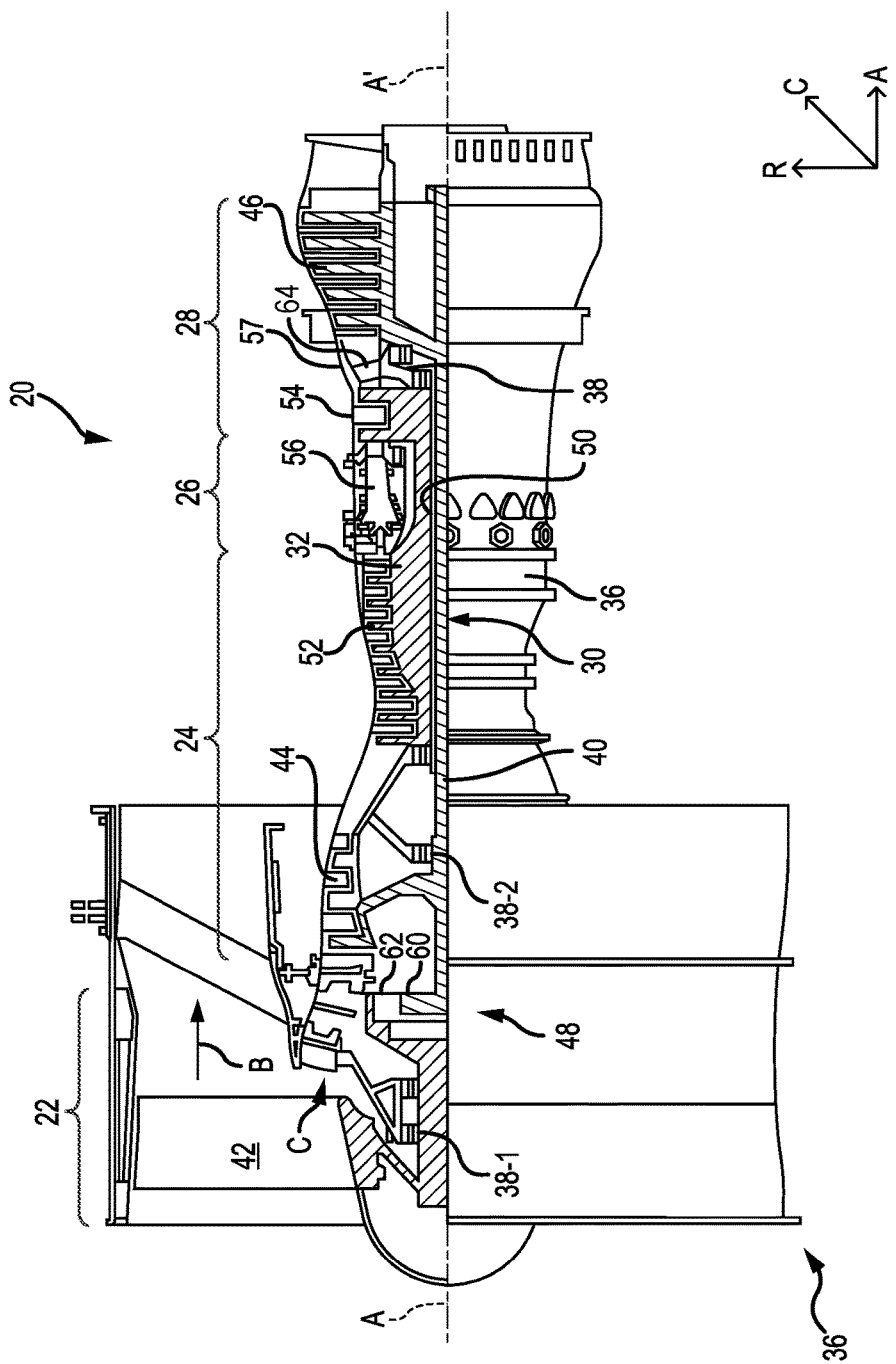
FIG. 1 illustrates a schematic cross-section of an exemplary gas turbine engine, in accordance with various embodiments.

In various embodiments, and with reference to FIG. 1, a gas turbine engine 20 is disclosed. As used herein, "aft" refers to the direction associated with a tail (e.g., the back end) of an aircraft, or generally, to the direction of exhaust of gas turbine engine 20. As used herein, "forward" refers to the direction associated with a nose (e.g., the front end) of the aircraft, or generally, to the direction of flight or motion. An A-R-C axis has been included throughout the figures to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 20 may comprise a two-spool turbofan that generally incorporates a fan section 22, a compressor section 24, a combustor section 26, and a turbine section 28. Gas turbine engine 20 may also comprise, for example, an augmenter section, and/or any other suitable system, section, or feature. In operation, fan section 22 may drive coolant (e.g., air) along a bypass flow-path B, while compressor section 24 may further drive coolant along a core flow-path C for compression and communication into combustor section 26, before expansion through turbine section 28. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 20 may comprise a low speed spool 30 and a high speed spool 32 mounted for rotation about an engine central longitudinal axis A-A' relative to an engine static structure 36 or an engine case via one or more bearing systems 38 (shown as, for example, bearing system 38-1 and bearing system 38-2 in FIG. 1). It should be understood that various bearing systems 38 at various locations may alternatively or additionally be provided, including, for example, bearing system 38, bearing system 38-1, and/or bearing system 38-2.

In various embodiments, low speed spool 30 may comprise an inner shaft 40 that interconnects a fan 42, a low pressure (or a first) compressor section 44, and a low pressure (or a second) turbine section 46. Inner shaft 40 may be connected to fan 42 through a geared architecture 48 that can drive fan 42 at a lower speed than low speed spool 30. Geared architecture 48 may comprise a gear assembly 58 enclosed within a gear housing 59. Gear assembly 58 may couple inner shaft 40 to a rotating fan structure. High speed spool 32 may comprise an outer shaft 50 that interconnects a high pressure compressor ("HPC") 52 (e.g., a second compressor section) and high pressure (or a first) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and may rotate via bearing systems 38 about engine central longitudinal axis A-A'. As used herein, a "high pressure" compressor and/or turbine may experience a higher pressure than a corresponding "low pressure" compressor and/or turbine.

In various embodiments, the coolant along core airflow C may be compressed by low pressure compressor 44 and HPC 52, mixed and burned with fuel in combustor 56, and expanded over high pressure turbine 54 and low pressure turbine 46. Mid-turbine frame 57 may comprise airfoils 65 located in core airflow path C. Low pressure turbine 46 and high pressure turbine 54 may rotationally drive low speed spool 30 and high speed spool 32, respectively, in response to the expansion.

In various embodiments, gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
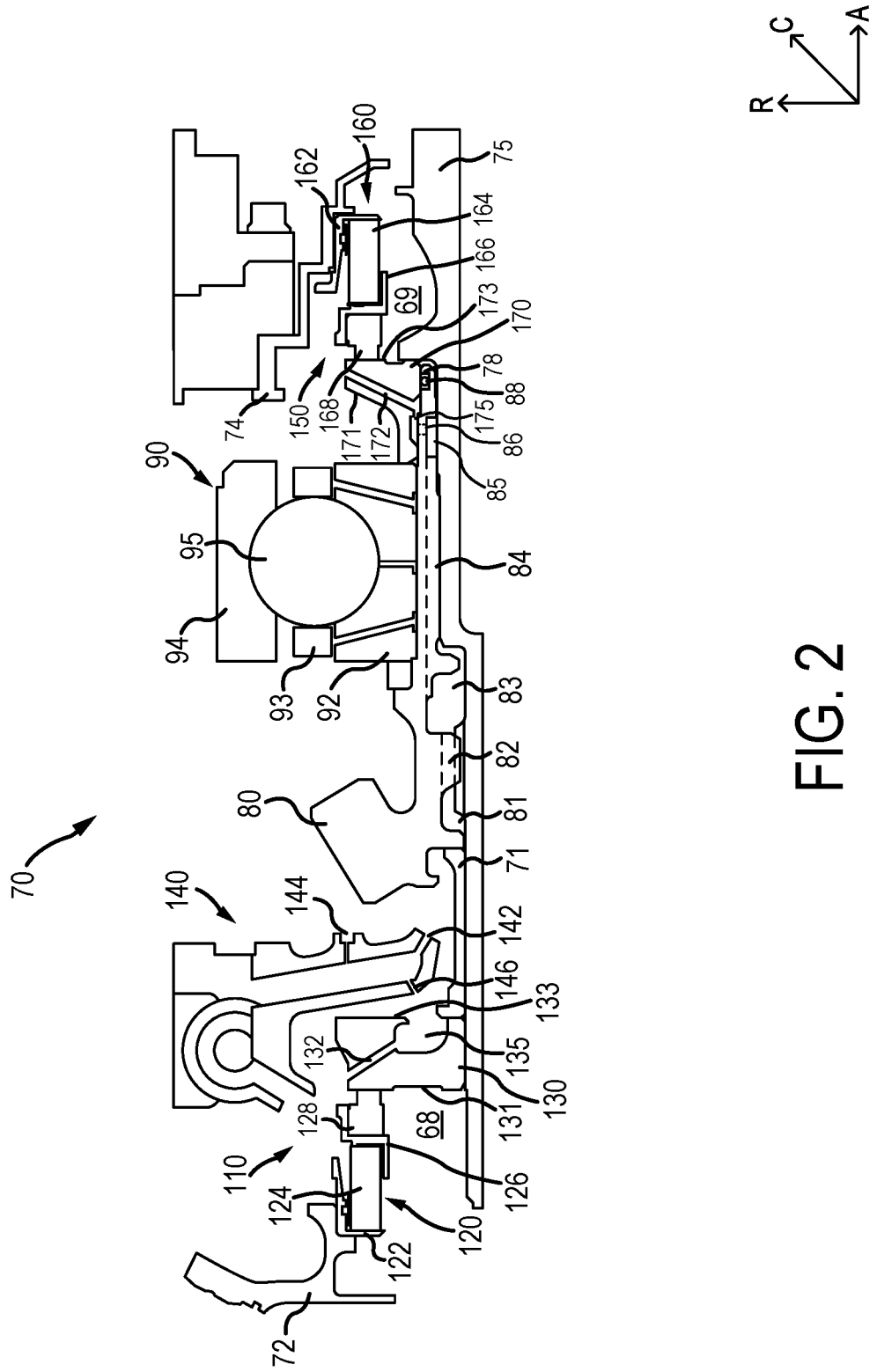
FIG. 2 illustrates a schematic cross-section of a mid-bearing compartment of a gas turbine engine, in accordance with various embodiments.

In various embodiments, gas turbine engine 20 may comprise a mid-bearing compartment 70, which may comprise various bearings, gears, supports, and/or engine structural components. With combined reference to FIGS. 1 and 2, a mid-bearing compartment 70 of a gas turbine engine 20 is depicted in FIG. 2, in accordance with various embodiments. Although a gas turbine engine is used for exemplary purposes, sealing configurations of the present disclosure may be used in various embodiments in any suitable device or apparatus having a sealing configuration.

Mid-bearing compartment 70 may include a rotating shaft 75 configured to rotate about engine central longitudinal axis A-A'. Rotating shaft 75 may engage a bull gear 80 which also rotates about engine central longitudinal axis A-A'. Bull gear 80 may engage an inner bearing ring 92 of a bearing 90 which also rotates about engine central longitudinal axis A-A'. Bearing 90 may be defined by inner bearing ring 92, an outer bearing ring 94, one or more bearing elements 95 (e.g., spherical balls, cylindrical rollers, and/or the like) disposed between outer bearing ring 94 and inner bearing ring 92, and a bearing cage 93. Outer bearing ring 94 may be rotationally stationary about engine central longitudinal axis A-A'. Bearing 90 and bull gear 80 may engage an aft seal plate 170, as discussed further herein. Rotating shaft 75 may engage a forward spacer 71 located forward of bull gear 80. An aft end of forward spacer 71 may be in contact with bull gear 80. Rotating shaft 75 may also engage a forward seal plate 130, as discussed further herein. A forward end of forward spacer 71 may be in contact with forward seal plate 130.

In various embodiments, mid-bearing compartment 70 may comprise one or more lubricating spray nozzles 140 (one shown). Each lubricating spray nozzle 140 may be configured to provide a lubricating fluid (such as oil, and/or the like) to mid-bearing compartment 70. For example, lubricating spray nozzle 140 may deliver the lubricating fluid through one or more fluid outlets, such as a first fluid outlet 142, a second fluid outlet 144, and/or a third fluid outlet 146. Each fluid outlet 142, 144, 146 may define a void on an outer surface of lubricating spray nozzle 140, allowing pressurized lubricating fluid to flow through lubricating spray nozzle 140, via a lubricating fluid source, and out each respective fluid outlet 142, 144, 146. Each fluid outlet 142, 144, 146 may be configured to deliver lubricating fluid to one or more locations in mid-bearing compartment 70.

For example, first fluid outlet 142 may be configured to deliver lubricating fluid to a first fluid compartment 81. First fluid compartment 81 may be defined by a radially inner surface of bull gear 80 and a radially outer surface of rotating shaft 75, forward of a first fluid passage 82. First fluid compartment 81 may be in fluid communication with a second fluid compartment 83, via a first fluid passage 82. First fluid passage 82 may define an axial channel on a radially inner surface of bull gear 80 near the engagement of bull gear 80 to rotating shaft 75. Second fluid compartment 83 may be defined by the radially inner surface of bull gear 80 and the radially outer surface of rotating shaft 75, aft of first fluid passage 82 and forward of second fluid passage 84. In that regard, the lubricating fluid from first fluid outlet 142 may flow from first fluid compartment 81 through first fluid passage 82 and into second fluid compartment 83. Second fluid compartment 83 may be in fluid communication with a third fluid compartment 85, via a second fluid passage 84. Second fluid passage 84 may define an axial channel on a radially inner surface of bull gear 80 near the engagement of bull gear 80 to rotating shaft 75, aft of first fluid passage 82 and radially inward from bearing 90. Third fluid compartment 85 may be defined by the radially inner surface of bull gear 80 and the radially outer surface of rotating shaft 75, aft of second fluid passage 84. In that regard, the lubricating fluid may flow from second fluid compartment 83 through second fluid passage 84 and into third fluid compartment 85. Third fluid compartment 85 may be in fluid communication with fluid dam 175, via a third fluid passage 86. Third fluid passage 86 may define a radial channel on the radially inner surface of bull gear 80, in a location axially inward from aft seal plate 170. Fluid dam 175 may be defined by an axially inner surface of aft seal plate 170 and an axially outer surface of bull gear 80 near the engagement of aft seal plate 170 to bull gear 80. In that regard, the lubricating fluid from third fluid compartment 85 may flow through third fluid passage 86 and into fluid dam 175.

In various embodiments, second fluid outlet 144 may be configured to deliver lubricating fluid to bull gear 80 and further components aft of bull gear 80. Third fluid outlet 146 may be configured to deliver lubricating fluid to fluid cavity 135, as discussed further herein.

In various embodiments, a forward sealing configuration 110 may comprise a forward seal assembly 120 forward of an adjacent forward seal plate 130. Forward sealing configuration 110 may be configured to provide active cooling to forward seal assembly 120 and forward seal plate 130. For example, and as discussed further herein, forward seal plate 130 may deliver a lubricating fluid to a location adjacent to a sealing interface in forward sealing configuration 110 to disperse heat generated between forward seal plate 130 and forward seal assembly 120. Delivering the lubricating fluid to a location adjacent to the sealing interface may also allow more heat to be removed at the sealing interface during gas turbine engine 20 operation compared to typical sealing configurations of the prior art. In that respect, forward sealing configuration 110 may increase durability, wear resistance, performance, and/or reliability in forward seal assembly 120 and forward seal plate 130. Forward sealing configuration 110 may also delay and/or at least partially prevent seal failure between forward seal assembly 120 and forward seal plate 130 during gas turbine engine 20 operation. Forward seal plate 130 may rotate about engine central longitudinal axis A-A' while forward seal assembly 120 remains rotationally stationary about engine central longitudinal axis A-A'. Forward seal assembly 120, forward seal plate 130, and rotating shaft 75 may define a forward air chamber 68 (e.g., in an axially forward section of mid-bearing compartment 70). In that respect, forward seal assembly 120 and forward seal plate 130 may be configured to at least partially minimize leakage of air from forward air chamber 68 into mid-bearing compartment 70 (e.g., a lubricating compartment), and/or to at least partially minimize leakage of lubricating fluid from mid-bearing compartment 70 into forward air chamber 68.

Figure 3:
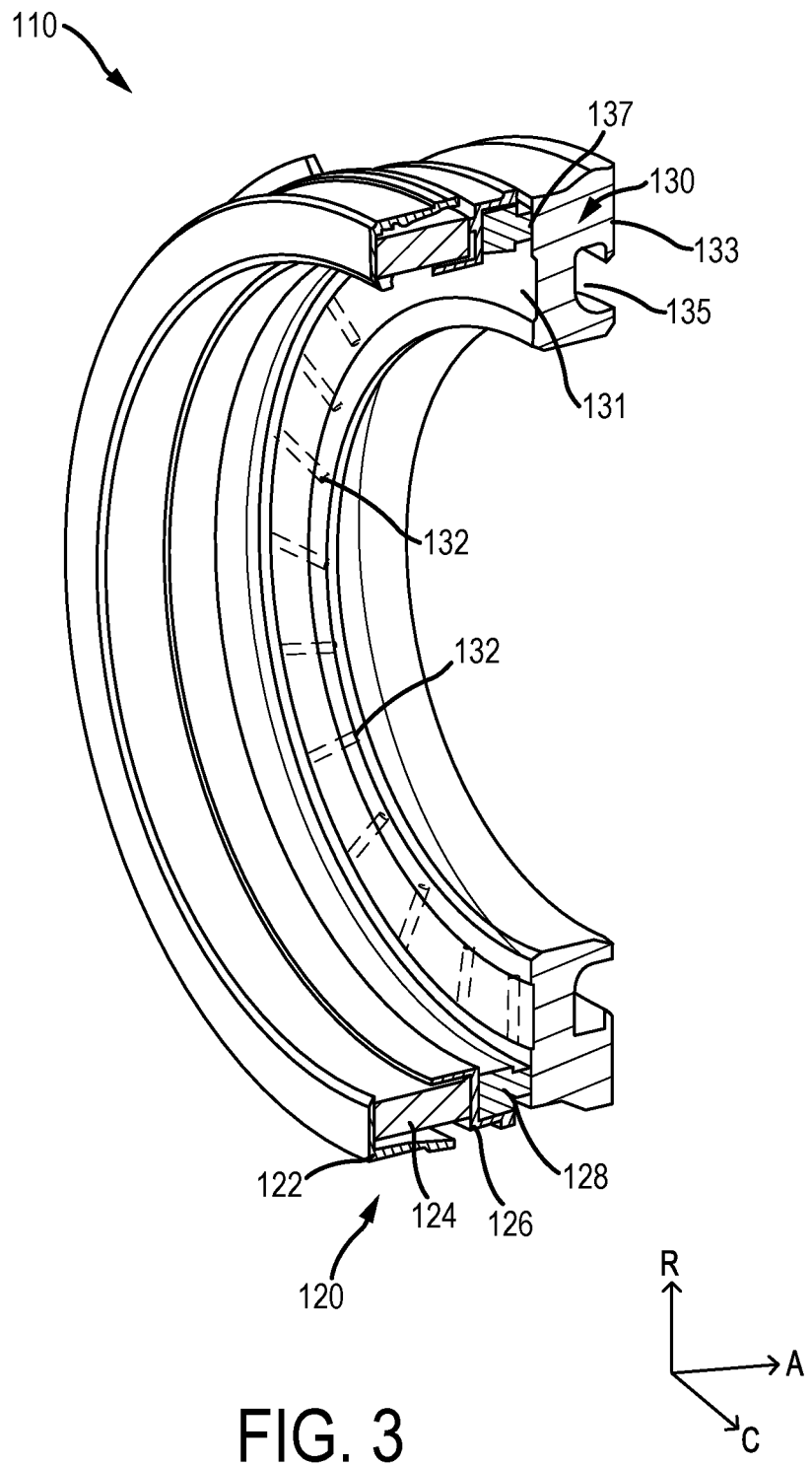
FIG. 3 illustrates a forward to aft view of a forward sealing configuration, in accordance with various embodiments.

In various embodiments, and with reference to FIG. 3, a forward to aft view of forward sealing configuration 110 is depicted in greater detail. With continued reference to FIGS. 2 and 3, forward seal assembly 120 may comprise a forward seal housing 122, a forward bellows spring 124, a forward carbon carrier 126, and/or a forward carbon 128. Forward seal housing 122 may be integrally coupled to a mid-compartment housing 72, and may be coupled to and provide radial support to forward bellows spring 124 (e.g., via welding, brazing, an adhesive, and/or the like). Forward bellows spring 124 may be configured to compress to provide axial force against mid-compartment housing 72, via forward seal housing 122, and against forward carbon carrier 126. In various embodiments, use of a forward bellows spring 124 in forward seal assembly 120 may reduce weight in forward seal assembly 120 relative to typical springs in the prior art, and may also at least partially reduce a spring load needed to maintain an axial force between mid-compartment housing 72 and forward seal plate 130. Forward carbon carrier 126 may be coupled to and provide radial support to forward carbon 128. Forward carbon 128 may be flush against forward seal plate 130 to provide a sealing interface (e.g., to at least partially seal forward air chamber 68 from mid-bearing compartment 70). For example, forward carbon 128 may be flush against a first forward seal plate contact surface 137, as described further herein.

In various embodiments, forward seal plate 130 may be configured to at least partially provide sealing between forward air chamber 68 and mid-bearing compartment 70. Forward seal plate 130 may also be configured to provide lubricating fluid to a location adjacent to the sealing interface between forward seal plate 130 and forward carbon 128, as discussed further herein. Forward seal plate 130 may comprise a first forward seal plate surface 131 axially opposite a second forward seal plate surface 133. First forward seal plate surface 131 may comprise a first forward seal plate contact surface 137 defining a portion of first forward seal plate surface 131 and configured to interface with forward seal assembly 120. First forward seal plate surface 131 and/or second forward seal plate surface 133 may comprise any suitable coating, such as, for example, chrome carbide and/or the like. Second forward seal plate surface 133 may define fluid cavity 135. Fluid cavity 135 may be in fluid communication with mid-bearing compartment 70 and may be configured to receive lubricating fluid from lubricating spray nozzles 140, via third fluid outlet 146. Fluid cavity 135 may be configured to retain the lubricating fluid before delivery of the lubricating fluid through each forward cooling hole 132, as discussed further herein.

Fluid cavity 135 may be in fluid communication with one or more forward cooling holes 132. Each forward cooling hole 132 may define a channel extending radially outward from fluid cavity 135 towards first forward seal plate surface 131. Forward cooling holes 132 may be circumferentially spaced through forward seal plate 130. Forward cooling holes 132 may be spaced equidistantly, or at any other suitable and/or desired interval. Forward seal plate 130 may comprise any suitable number of forward cooling holes 132. Each forward cooling hole 132 may be configured to deliver lubricating fluid from fluid cavity 135 to a location adjacent to the sealing interface between first forward seal plate contact surface 131 and forward carbon 128 of forward seal assembly 120. Stated differently, each forward cooling hole 132 may be configured to deliver lubricating fluid from fluid cavity 135 to a location radially outward from and axially in line with the sealing interface between first forward seal plate contact surface 131 and forward carbon 128 of forward seal assembly 120. Each forward cooling hole 132 may be displaced at any suitable angle relative to fluid cavity 135 to allow forward cooling holes 132 to deliver the lubricating fluid to the sealing interface of forward sealing configuration 110. Delivering the lubricating fluid to a location adjacent to the sealing interface of forward sealing configuration 110 may provide active cooling during gas turbine engine 20 operation (e.g., by removing more heat at the sealing interface relative to systems without lubricating fluid) to at least partially reduce the wear rate of components in forward sealing configuration 110 (e.g., the wear rate of forward carbon 128 and other similar sealing components), and may also at least partially reduce the wear rate of coatings on first forward seal plate surface 131 (e.g., from delaminating due to high temperature in gas turbine engine 20).

In various embodiments, aft sealing configuration 150 may comprise an aft seal assembly 160 forward of an adjacent aft seal plate 170. Aft sealing configuration 150 may be configured to provide active cooling to aft seal assembly 160 and aft seal plate 170. For example, and as discussed further herein, aft seal plate 170 may deliver a lubricating fluid to a location adjacent to a sealing interface in aft sealing configuration 150 to disperse heat generated between aft seal plate 170 and aft seal assembly 160. Stated differently, aft seal plate 170 may deliver a lubricating fluid to a location radially outward from and axially in line with the sealing interface in aft sealing configuration 150 to disperse heat generated between aft seal plate 170 and aft seal assembly 160. Delivering the lubricating fluid to the sealing interface may also allow more heat to be removed at the sealing interface during gas turbine engine 20 operation compared to typical sealing configurations of the prior art. In that respect, aft sealing configuration 150 may increase durability, wear resistance, performance, and/or reliability in aft seal assembly 160 and aft seal plate 170. Aft sealing configuration 150 may also delay and/or at least partially prevent seal failure between aft seal assembly 160 and aft seal plate 170 during gas turbine engine 20 operation. Aft seal plate 170 may rotate about engine central longitudinal axis A-A' while aft seal assembly 160 remains rotationally stationary about engine central longitudinal axis A-A'. Aft seal assembly 160, aft seal plate 170, and rotating shaft 75 may define an aft air chamber 69 (e.g., in an axially aft section of mid-bearing compartment 70). In that respect, aft seal assembly 160 and aft seal plate 170 may be configured to at least partially minimize leakage of air from aft air chamber 69 into mid-bearing compartment 70 (e.g., a lubricating compartment), and/or to at least partially minimize leakage of lubricating fluid from mid-bearing compartment 70 into aft air chamber 69.

Figure 4:
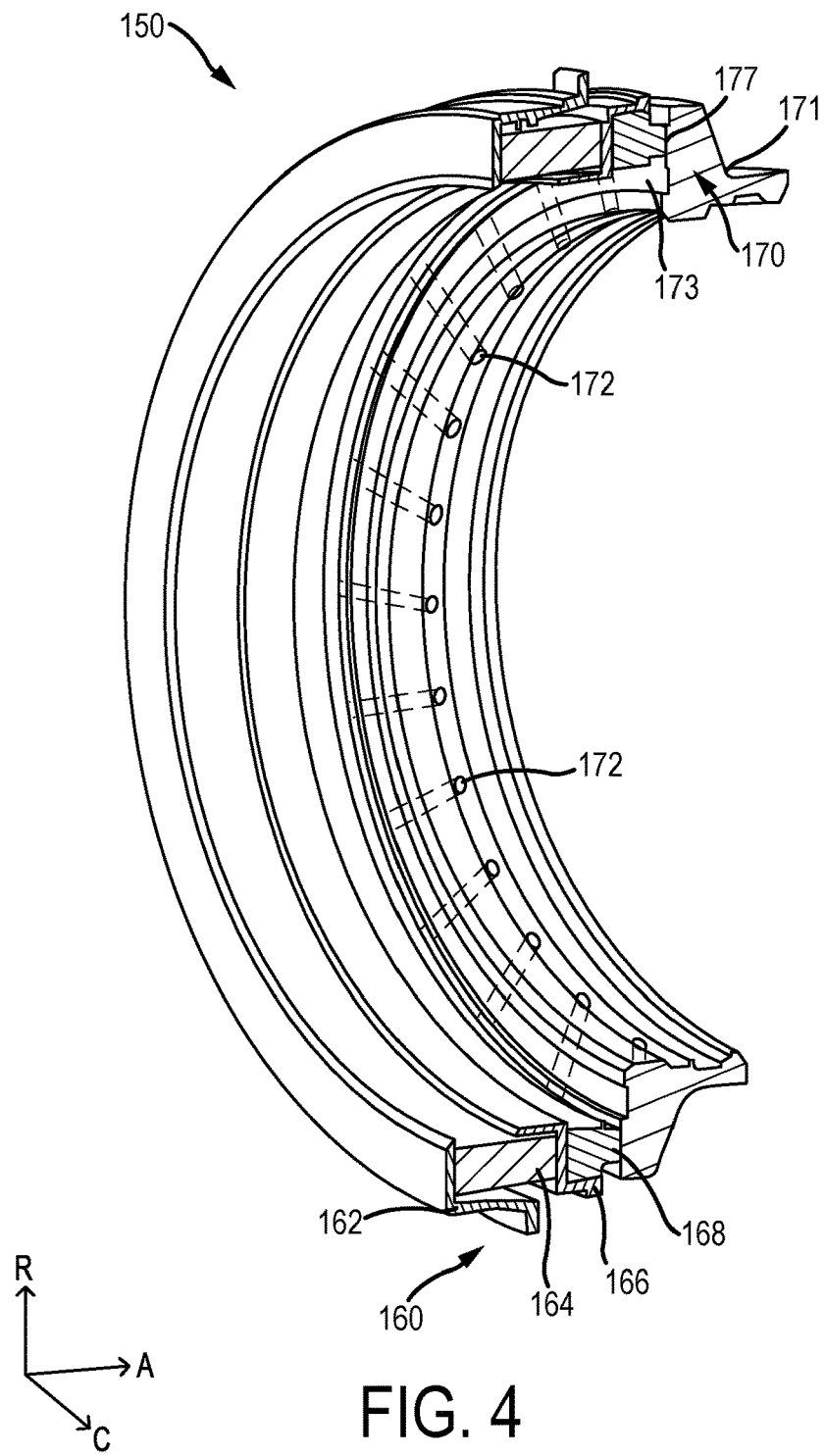
FIG. 4 illustrates an aft to forward view of an aft sealing configuration, in accordance with various embodiments.

In various embodiments, and with reference to FIG. 4, an aft to forward view of aft sealing configuration 150 is depicted in greater detail. With continued reference to FIGS. 2 and 4, aft seal assembly 160 may comprise an aft seal housing 162, an aft bellows spring 164, an aft carbon carrier 166, and/or an aft carbon 168. Aft seal housing 162 may be integrally coupled to a mid-compartment static structure 74, and may be coupled to and provide radial support to aft bellows spring 164 (e.g., via welding, brazing, an adhesive, and/or the like). Aft bellows spring 164 may be configured to compress to provide axial force against mid-compartment static structure 74, via aft seal housing 162, and against aft carbon carrier 166. In various embodiments, use of aft bellows spring 164 in aft seal assembly 160 may reduce weight in aft seal assembly 160 relative to typical springs used in the prior art and may also at least partially reduce a spring load needed to maintain an axial force between mid-compartment static structure 74 and aft seal plate 170. Aft carbon carrier 166 may be coupled to and provide radial support to aft carbon 168. Aft carbon 168 may be flush against aft seal plate 170 to provide a sealing interface (e.g., to at least partially seal aft air chamber 69 from mid-bearing compartment 70). For example, aft carbon 168 may be flush against a second aft seal plate contact surface 177, as described further herein.

In various embodiments, aft seal plate 170 may be configured to at least partially provide sealing between aft air chamber 69 and mid-bearing compartment 70. Aft seal plate 170 may engage bull gear 80. In that respect, aft seal plate 170 and bull gear 80 may define a sealing cavity 78. Sealing cavity 78 may be filled with one or more sealing elements 88 (such as an O-ring), to at least partially provide additional sealing between aft seal plate 170 and bull gear 80. Aft seal plate 170 may also be configured to provide lubricating fluid to a location adjacent to the sealing interface between aft seal plate 170 and aft carbon 168, as discussed further herein. Aft seal plate 170 may comprise a first aft seal plate surface 171 axially opposite a second aft seal plate surface 173. Second aft seal plate surface 173 may comprise a second aft seal plate contact surface 177 defining a portion of second aft seal plate surface 173 configured to interface with aft seal assembly 160. First aft seal plate surface 171 and/or second aft seal plate surface 173 may comprise any suitable coating, such as, for example, chrome carbide and/or the like.

An axially inner surface of aft seal plate 170 and an axially outer surface of bull gear 80 may further define a fluid dam 175. As previously discussed herein, fluid dam 175 may be configured to receive lubricating fluid from lubricating spray nozzles 140, via first fluid outlet 142, and by way of first fluid compartment 81, first fluid passage 82, second fluid compartment 83, second fluid passage 84, third fluid compartment 85, and third fluid passage 86. Fluid dam 175 may be configured to retain the lubricating fluid before delivery of the lubricating fluid through each aft cooling hole 172, as discussed further herein.

Fluid dam 175 may be in fluid communication with one or more aft cooling holes 172. Each aft cooling hole 172 may define a channel extending radially outward from fluid dam 175 towards second aft seal plate surface 173, and may be circumferentially spaced through aft seal plate 170. Aft cooling holes 172 may be spaced equidistantly, or at any other suitable and/or desired interval. Aft seal plate 170 may comprise any suitable number of aft cooling holes 172. Each aft cooling hole 172 may be configured to deliver lubricating fluid from fluid dam 175 to the sealing interface between second aft seal plate contact surface 177 and aft carbon 168 of aft seal assembly 160. Each aft cooling hole 172 may be displaced at any suitable angle relative to fluid dam 175 to allow aft cooling holes 172 to deliver the lubricating fluid to a location adjacent to the sealing interface of aft sealing configuration 150. Delivering the lubricating fluid to a location adjacent to the sealing interface of aft sealing configuration 150 may provide active cooling (e.g., by removing more heat at the sealing interface relative to systems without lubricating fluid) during gas turbine engine 20 operation to at least partially reduce the wear rate of components in aft sealing configuration 150 (e.g., the wear rate of aft carbon 168, and similar sealing components), and may also at least partially reduce the wear rate of coatings on second aft seal plate surface 173 (e.g., from delaminating due to high temperature in gas turbine engine 20).

Figure 5A:
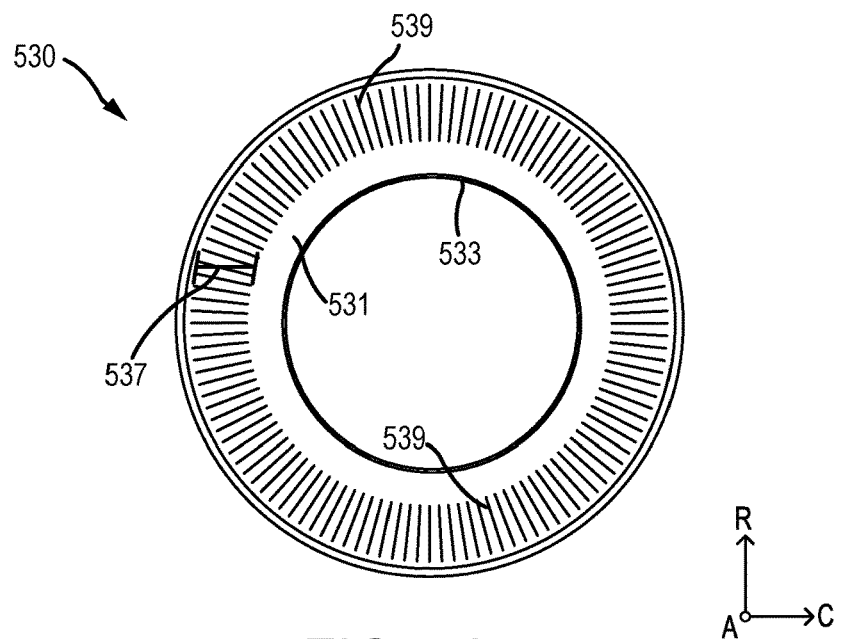
FIG. 5A illustrates a forward to aft view of a forward seal plate having hydrodynamic grooves, in accordance with various embodiments.
Figure 5B:
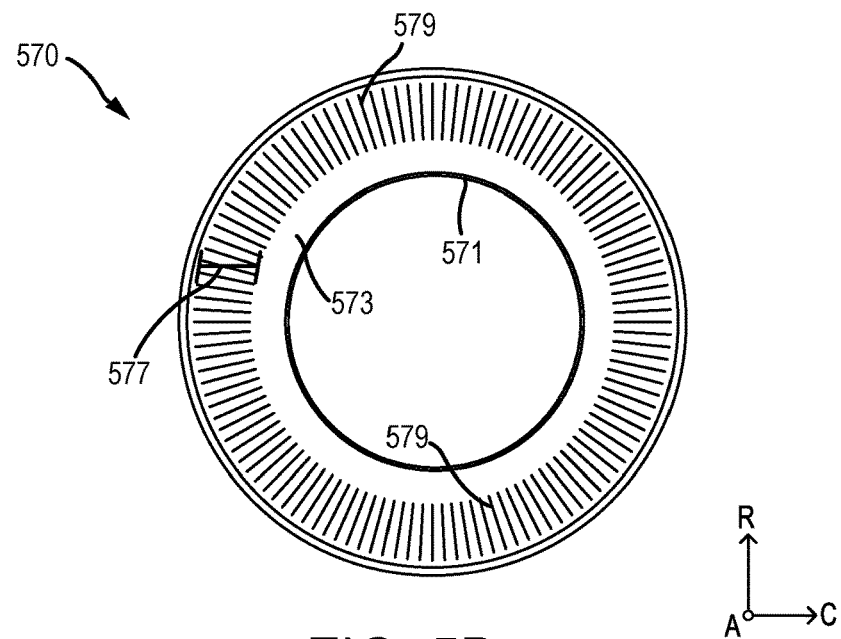
FIG. 5B illustrates an aft to forward view of an aft seal plate having hydrodynamic grooves, in accordance with various embodiments.

In various embodiments, and with reference to FIGS. 5A and 5B, a forward seal plate 530 and an aft seal plate 570 may also comprise hydrodynamic grooves configured to further provide active cooling to each respective sealing configuration. For example, and with specific reference to FIG. 5A, a forward to aft view of a forward seal plate 530 is depicted. Forward seal plate 530 may comprise a first forward seal plate surface 531 axially opposite a second forward seal plate surface 533. First forward seal plate surface 531 may define one or more forward plate hydrodynamic grooves 539. For example, forward plate hydrodynamic grooves 539 may be located on a first forward seal plate contact surface 537. Forward seal plate 530 may comprise any suitable number of forward plate hydrodynamic grooves 539. Each forward plate hydrodynamic groove 539 may be configured to deliver cooling air to the sealing interface between first forward seal plate contact surface 537 and forward carbon 128 of forward seal assembly 120 (with brief reference to FIG. 3). In this regard, forward plate hydrodynamic grooves 539 may provide a hydrodynamic lift force to the interface of the first seal plate contact surface 537 and the forward seal assembly 120 (with brief reference to FIG. 3). Each forward plate hydrodynamic grooves 539 may be displaced at any suitable angle relative to an axially inner surface of forward seal plate 530. For example, and as depicted in FIG. 5A, forward plate hydrodynamic grooves 539 may be displaced in the radial direction. As a further example, and in various embodiments, forward plate hydrodynamic grooves 539 may be displaced in a spiral configuration, and/or in any other suitable configuration.

As a further example, and with specific reference to FIG. 5B, an aft to forward view of an aft seal plate 570 is depicted. Aft seal plate 570 may comprise a second aft seal plate surface 573 axially opposite a first aft seal plate surface 571. Second aft seal plate surface 573 may define one or more aft plate hydrodynamic grooves 579. For example, aft plate hydrodynamic grooves 579 may be located on a second aft seal plate contact surface 577. Aft seal plate 570 may comprise any suitable number of aft plate hydrodynamic grooves 579. Each aft plate hydrodynamic groove 579 may be configured to deliver cooling air to the sealing interface between second aft seal plate contact surface 577 and aft carbon 168 of aft seal assembly 160 (with brief reference to FIG. 4). In this regard, aft plate hydrodynamic grooves 579 may provide a hydrodynamic lift force to the interface of the second seal plate contact surface 577 and the aft seal assembly 160 (with brief reference to FIG. 4). Each aft plate hydrodynamic groove 579 may be displaced at any suitable angle relative to an axially inner surface of aft seal plate 570. For example, and as depicted in FIG. 5B, aft plate hydrodynamic grooves 579 may be displaced in a radial direction. As a further example, and in various embodiments, aft plate hydrodynamic grooves 579 may be displaced in a spiral configuration, and/or any other suitable configuration.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to be interpreted as a means-plus-function element unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A sealing configuration for an axially forward section of a bearing compartment of a gas turbine engine, comprising:
    a seal plate disposed axially forward of a bearing in the bearing compartment, the seal plate comprising:
        a first seal plate surface axially opposite a second seal plate surface;
        a fluid cavity defining a void on the second seal plate surface, wherein the fluid cavity is configured to receive a lubricating fluid from a lubricating spray nozzle in the bearing compartment; and
        a plurality of cooling holes in fluid communication with the fluid cavity, each cooling hole defining a channel through the first seal plate surface into the fluid cavity; and
    a bellows spring configured to interface with the first seal plate surface of the seal plate, wherein the bellows spring is configured to provide an axial force against the first seal plate surface of the seal plate.

2. The sealing configuration of claim 1, further comprising:
    a seal housing coupled to a first axial end of the bellows spring;
    a carbon carrier coupled to a second axial end of the bellows spring; and
    a carbon coupled to the carbon carrier, wherein the carbon is configured to provide a sealing interface against the first seal plate surface of the seal plate.

3. The sealing configuration of claim 1, wherein the first seal plate surface comprises a first seal plate contact surface configured to interface with the bellows spring.

4. The sealing configuration of claim 3, wherein the first seal plate contact surface defines a hydrodynamic groove configured to provide a hydrodynamic lift force to the interface of the first seal plate contact surface and the bellows spring.

5. The sealing configuration of claim 4, wherein the first seal plate surface comprises a chrome carbide coating.

6. A sealing configuration for an axially aft section of a bearing compartment of a gas turbine engine, comprising:
- a seal plate disposed axially forward of a bearing in the bearing compartment, the seal plate comprising:
  - a first seal plate surface axially opposite a second seal plate surface;
  - a fluid dam defining a void on a radially inner surface of the seal plate; and
  - a plurality of cooling holes in fluid communication with the fluid dam, each cooling hole defining a channel through the second seal plate surface into the fluid dam;
- a carbon configured to provide a sealing interface against the second seal plate surface of the seal plate;
- a carbon carrier coupled to the carbon and configured to provide radial support to the carbon;
- a bellows spring configured to interface with the carbon carrier to provide an axial force against the second seal plate surface of the seal plate; and
- a seal housing coupled to the bellows springs and configured to provide radial support to the bellows spring.

7. The sealing configuration of claim 6, wherein the second seal plate surface comprises a second seal plate contact surface configured to interface with the carbon.

8. The sealing configuration of claim 7, wherein the second seal plate contact surface defines a hydrodynamic groove configured to provide a hydrodynamic lift force to the sealing interface of the second seal plate contact surface and the carbon.

9. The sealing configuration of claim 8, wherein the second seal plate surface comprises a chrome carbide coating.

10. A gas turbine engine, comprising:
- a bull gear coupled to a rotating shaft;
- a bearing coupled to the bull ring;
- a forward sealing configuration coupled to the rotating shaft forward the bull gear and the bearing, the forward sealing configuration comprising:
  - a forward seal plate, comprising:
    - a first forward seal plate surface axially opposite a second forward seal plate surface;
    - a fluid cavity defining a void on the second forward seal plate surface; and
    - a plurality of forward cooling holes in fluid communication with the fluid cavity, each forward cooling hole defining a channel through the first forward seal plate surface into the fluid cavity; and
  - a forward bellows spring configured to interface with the first forward seal plate surface, wherein the forward bellows spring is configured to provide a first axial force against the first forward seal plate surface; and
- an aft sealing configuration coupled to the bull gear aft the bearing, the aft sealing configuration comprising:
  - an aft seal plate, comprising:
    - a first aft seal plate surface axially opposite a second aft seal plate surface;
    - a fluid dam defining a void on a radially inner surface of the aft seal plate; and
    - a plurality of aft cooling holes in fluid communication with the fluid dam, each aft cooling hole defining a channel through the second aft seal plate surface into the fluid dam; and
  - an aft bellows spring configured to interface with the second aft seal plate surface, wherein the aft bellows spring is configured to provide a second axial force against the second aft seal plate surface.

11. The gas turbine engine of claim 10, further comprising a lubricating spray nozzle located forward of the bull gear, the lubricating spray nozzle comprising a first fluid outlet and a second fluid outlet.

12. The gas turbine engine of claim 11, wherein a radially inner surface of the bull gear and a radially outer surface of the rotating shaft define a fluid passage configured to receive a lubricating fluid from the first fluid outlet of the lubricating spray nozzle, and wherein the fluid passage is in fluid communication with the fluid dam of the aft seal plate.

13. The gas turbine engine of claim 12, wherein the aft cooling holes are configured to receive the lubricating fluid from the fluid dam and deliver the lubricating fluid to a location adjacent to the interface of the second aft seal plate surface and the aft bellows spring.

14. The gas turbine engine of claim 11, wherein the fluid cavity of the forward seal plate is configured to receive a lubricating fluid from the second fluid outlet of the lubricating spray nozzle.

15. The gas turbine engine of claim 14, wherein the forward cooling holes are configured to receive the lubricating fluid from the fluid cavity and deliver the lubricating fluid to a location adjacent to the interface of the first forward seal plate surface and the forward bellows spring.

16. The gas turbine engine of claim 10, wherein the forward sealing configuration further comprises:
- a forward seal housing coupled to a first axial end of the forward bellows spring;
- a forward carbon carrier coupled to a second axial end of the forward bellows spring; and
- a forward carbon coupled to the forward carbon carrier, wherein the forward carbon is configured to provide a forward sealing interface against the first forward seal plate surface of the forward seal plate.

17. The gas turbine engine of claim 10, wherein the aft sealing configuration further comprises:
- an aft seal housing coupled to a first axial end of the aft bellows spring;
- an aft carbon carrier coupled to a second axial end of the aft bellows spring; and
- an aft carbon coupled to the aft carbon carrier, wherein the aft carbon is configured to provide an aft sealing interface against the second aft seal plate surface of the aft seal plate.

18. The gas turbine engine of claim 10, wherein the first forward seal plate surface of the forward seal plate defines a plurality of forward hydrodynamic grooves configured to provide a hydrodynamic lift force to the interface of the first forward seal plate surface and the forward bellows spring.

19. The gas turbine engine of claim 10, wherein the second aft seal plate surface of the aft seal plate defines a plurality of aft hydrodynamic grooves configured to provide a hydrodynamic lift force to the interface of the second aft seal plate surface and the aft bellows spring.

* * * * *